(12) United States Patent
Cottet

(10) Patent No.: US 8,998,133 B2
(45) Date of Patent: Apr. 7, 2015

(54) LANDING GEAR SYSTEM

(75) Inventor: Justin Duane Cottet, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1012 days.

(21) Appl. No.: 13/078,075

(22) Filed: Apr. 1, 2011

(65) Prior Publication Data
US 2012/0247892 A1    Oct. 4, 2012

(51) Int. Cl.
*B64C 25/22*    (2006.01)
*B64C 25/60*    (2006.01)
*B64C 25/00*    (2006.01)

(52) U.S. Cl.
CPC ........ *B64C 25/60* (2013.01); *B64C 25/22* (2013.01); *B64C 2025/008* (2013.01)

(58) Field of Classification Search
CPC .................. F16F 9/56; F16F 9/0245
USPC ........... 244/105 FP, 102 SS, 102 R, 10 FP; 267/64.12, 64.15, 64.16, 64.25, 64.26, 267/127, 217, 218; 188/300, 322.16, 297; 91/189 R, 189 A, 399; 92/52, 53
See application file for complete search history.

(56) References Cited

U.S. PATENT DOCUMENTS

| 2,193,736 A | 3/1940 | Onions |
| 2,783,744 A | 3/1957 | Tennis |
| 2,932,281 A | 4/1960 | Moskowitz |
| 3,082,980 A | 3/1963 | Lucien |
| 3,083,937 A | 4/1963 | Bainbridge et al. |
| 3,188,922 A * | 6/1965 | Cruse ................. 92/52 |
| 3,237,726 A * | 3/1966 | Deyerling ............ 188/269 |
| 3,290,038 A * | 12/1966 | Tollar ............... 267/64.12 |
| 3,322,376 A | 5/1967 | Neilson et al. |
| 3,335,642 A | 8/1967 | Rosaen |
| 3,426,651 A * | 2/1969 | Arendarski ............ 92/26 |
| 3,533,613 A * | 10/1970 | Bendicsen ........ 267/64.28 |

(Continued)

FOREIGN PATENT DOCUMENTS

| EP | 0295174 | 12/1988 |
| EP | 0614804 A1 | 9/1994 |

(Continued)

OTHER PUBLICATIONS

Lindahl et al., "Hydraulic Actuator for Semi Levered Landing Gear", U.S. Appl. No. 12/951,861, filed Nov. 22, 2010, 46 pages.

(Continued)

*Primary Examiner* — Nicholas J Lane
(74) *Attorney, Agent, or Firm* — Yee & Associates, P.C.

(57) ABSTRACT

A method and apparatus for changing a length of a landing gear system. A first cylinder and a second cylinder are moved relative to each other along an axis extending centrally through the first cylinder and the second cylinder such that the first cylinder and the second cylinder are in an extended position. In response to the first cylinder and the second cylinder being in the extended position, a flow of a fluid is substantially prevented between a first chamber formed between the first cylinder and the second cylinder and a second chamber within the first cylinder and the second cylinder. In response to a pressure applied to the first chamber, the first cylinder and the second cylinder are moved relative to each other along the axis such that a length of the first cylinder and the second cylinder is reduced.

15 Claims, 11 Drawing Sheets

(56) References Cited

U.S. PATENT DOCUMENTS

| | | | |
|---|---|---|---|
| 3,568,705 A | 3/1971 | Boyadjieff et al. | |
| 3,578,303 A | 5/1971 | Fullam | |
| 3,724,832 A | 4/1973 | Ceska | |
| 3,845,919 A | 11/1974 | Jenny | |
| 3,869,861 A | 3/1975 | Case | |
| 4,007,894 A | 2/1977 | Hartel | |
| 4,061,295 A | 12/1977 | Somm | |
| 4,075,929 A | 2/1978 | Peterson | |
| 4,088,286 A | 5/1978 | Masclet et al. | |
| 4,284,255 A * | 8/1981 | Masclet et al. | 244/102 R |
| 4,291,850 A * | 9/1981 | Sharples | 244/102 SS |
| 4,359,199 A | 11/1982 | Kramer et al. | |
| 4,381,857 A * | 5/1983 | Cook | 267/64.15 |
| 4,402,477 A | 9/1983 | Turiot et al. | |
| 4,445,672 A * | 5/1984 | Turiot | 267/64.16 |
| 4,457,212 A | 7/1984 | Unger et al. | |
| 4,746,086 A | 5/1988 | Happ | |
| 4,749,152 A | 6/1988 | Veaux et al. | |
| 4,749,452 A | 6/1988 | LaConti et al. | |
| 4,770,372 A | 9/1988 | Ralph | |
| 4,869,444 A | 9/1989 | Ralph | |
| 4,892,270 A | 1/1990 | Derrien et al. | |
| 4,940,197 A | 7/1990 | Putnam | |
| 5,029,775 A | 7/1991 | Abramovitsh | |
| 5,086,995 A | 2/1992 | Large | |
| 5,094,407 A | 3/1992 | Jampy et al. | |
| 5,140,894 A | 8/1992 | Snyder et al. | |
| 5,148,896 A | 9/1992 | Ralph | |
| 5,158,267 A * | 10/1992 | Pascal | 267/64.12 |
| 5,219,152 A * | 6/1993 | Derrien et al. | 267/64.15 |
| 5,271,314 A * | 12/1993 | Derrien | 92/8 |
| 5,299,761 A | 4/1994 | Robin et al. | |
| 5,310,140 A * | 5/1994 | Veaux et al. | 244/104 FP |
| 5,390,586 A | 2/1995 | Jones | |
| 5,396,973 A | 3/1995 | Schwemmer et al. | |
| 5,429,323 A | 7/1995 | Derrien et al. | |
| 5,460,340 A | 10/1995 | White | |
| 5,908,174 A * | 6/1999 | Churchill et al. | 244/102 SS |
| 6,182,925 B1 | 2/2001 | Kilner et al. | |
| 6,237,407 B1 | 5/2001 | Nance | |
| 6,345,564 B1 | 2/2002 | Kilner et al. | |
| 6,575,405 B2 | 6/2003 | Bryant et al. | |
| 7,426,983 B2 | 9/2008 | Ducos et al. | |
| 7,802,488 B2 | 9/2010 | Bucheton et al. | |
| 8,104,711 B2 | 1/2012 | Bennett et al. | |
| 2005/0011991 A1 | 1/2005 | Ducos et al. | |
| 2006/0220917 A1 | 10/2006 | Nance | |
| 2007/0068754 A1 | 3/2007 | Furgala | |
| 2007/0194172 A1* | 8/2007 | Luce et al. | 244/100 R |
| 2009/0050736 A1 | 2/2009 | Bennett et al. | |
| 2009/0108131 A1 | 4/2009 | Lavigne et al. | |
| 2009/0200760 A1 | 8/2009 | Gartner et al. | |
| 2009/0210105 A1 | 8/2009 | Lusby et al. | |
| 2010/0096499 A1* | 4/2010 | Luce et al. | 244/102 SS |
| 2010/0116930 A1 | 5/2010 | Griffin et al. | |
| 2010/0116931 A1 | 5/2010 | Wilby | |
| 2010/0181423 A1* | 7/2010 | Martin et al. | 244/104 FP |
| 2010/0187353 A1* | 7/2010 | Masson et al. | 244/104 FP |
| 2010/0219290 A1* | 9/2010 | Luce | 244/102 SL |
| 2011/0025966 A1 | 2/2011 | Sakai | |
| 2011/0233327 A1 | 9/2011 | Mellor et al. | |
| 2012/0126055 A1 | 5/2012 | Lindahl et al. | |
| 2012/0211600 A1 | 8/2012 | Mellor | |

FOREIGN PATENT DOCUMENTS

| | | |
|---|---|---|
| EP | 1041001 | 10/2000 |
| EP | 1749741 | 2/2007 |
| EP | 0743245 | 9/2011 |
| EP | 2489591 A1 | 8/2012 |
| FR | 2849830 A1 | 7/2004 |
| GB | 594541 A | 11/1947 |
| GB | 1024455 A | 3/1966 |
| GB | 2101542 | 1/1983 |
| GB | 2428650 | 2/2007 |
| WO | 2006094145 | 9/2006 |
| WO | 2006133902 | 12/2006 |
| WO | 2007015104 | 2/2007 |
| WO | 2011119283 | 9/2011 |

OTHER PUBLICATIONS

Mellor, "Air-Ground Detection System for Semi-Levered Landing Gear", U.S. Appl. No. 13/031,525, filed Feb. 21, 2011, 69 pages.

"Semi-Levered Gear Performs During Boeing 777-300ER Flight-Tests", Boeing news release, LeBourget, France, Jun. 2003, accessed May 15, 2012, 2 pages http://www.boeing.com/news/releases/2003/photorelease/q2/pr_030618g1.html.

PCT Search Report dated Aug. 4, 2011 regarding application PCT/US2011/025966 dated Feb. 23, 2011, applicant reference 09-0834PCT, applicant The Boeing Company, 13 pages.

EP Search Report dated Jun. 22, 2012 regarding application 12156210.2-2422, applicant reference NAM/P120557EO00, applicant The Boeing Company, 6 pages.

Long, "Semi-Lever Landing Gear", The Boeing Company, Oct. 2001, 13 pages.

Final Office Action, dated Jun. 21, 2013, regarding USPTO U.S. Appl. No. 12/951,861, 14 pages.

Final Office Action, dated Jul. 5, 2013, regarding USPTO U.S. Appl. No. 13/031,525, 21 pages.

Lindahl et al., "Hydraulic Strut Assembly for Semi-Levered Landing Gear," USPTO U.S. Appl. No. 13/474,332, filed May 17, 2012, 98 pages.

Office Action, dated Sep. 13, 2012, regarding USPTO U.S. Appl. No. 12/730,598, 10 pages.

Notice of Allowance, dated Jan. 28, 2013, regarding USPTO U.S. Appl. No. 12/730,598, 5 pages.

Office Action, dated Jan. 7, 2013, regarding USPTO U.S. Appl. No. 12/951,861, 20 pages.

Office Action, dated Dec. 21, 2012, regarding USPTO U.S. Appl. No. 13/031,525, 32 pages.

Office Action, dated Jun. 20, 2014, regarding USPTO U.S. Appl. No. 13/031,525, 16 pages.

Notice of Allowance, dated Jul. 28, 2014, regarding USPTO U.S. Appl. No. 13/031,525, 9 pages.

Office Action, dated Jul. 30, 2014, regarding USPTO U.S. Appl. No. 13/474,332, 26 pages.

Extended European Search Report, dated Mar. 4, 2014, regarding Application No. EP12159953.4, 6 pages.

Extended European Search Report, dated Aug. 22, 2014, regarding Application No. 11188624.8, 10 pages.

* cited by examiner

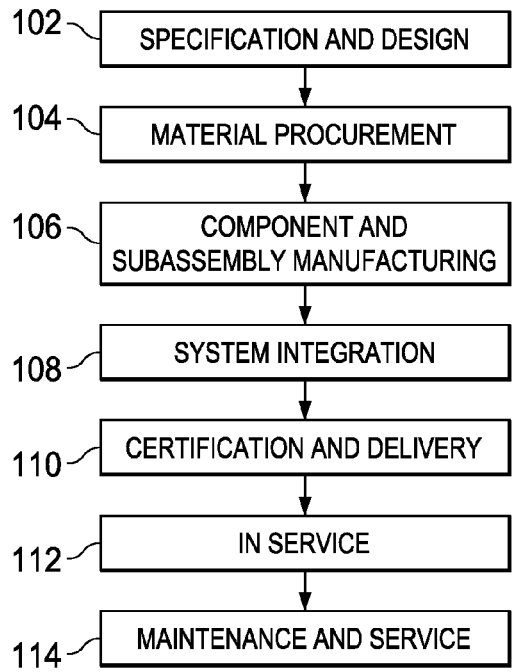
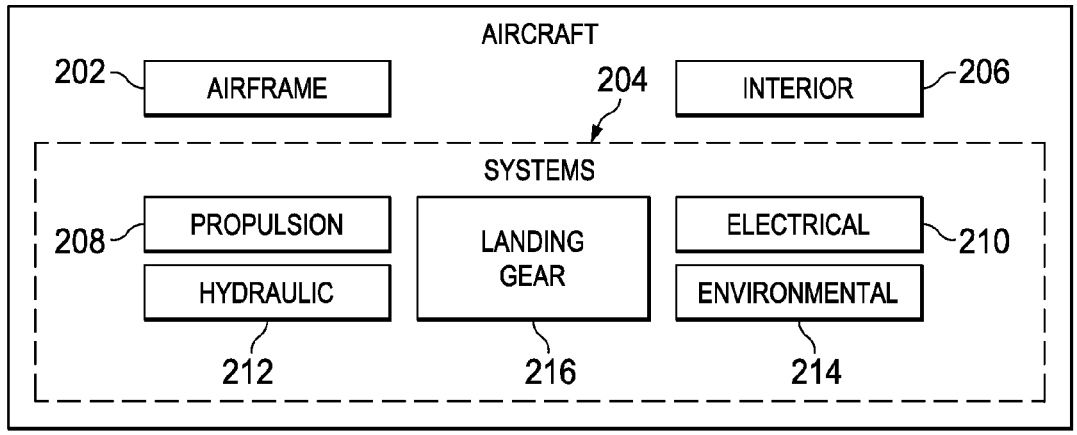

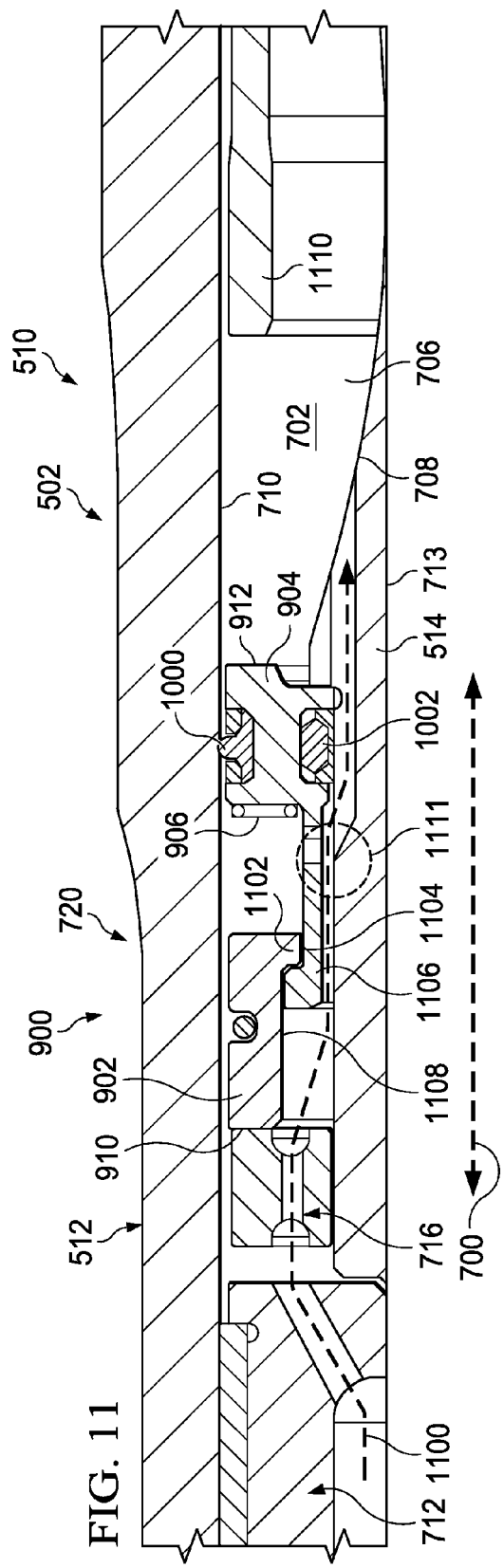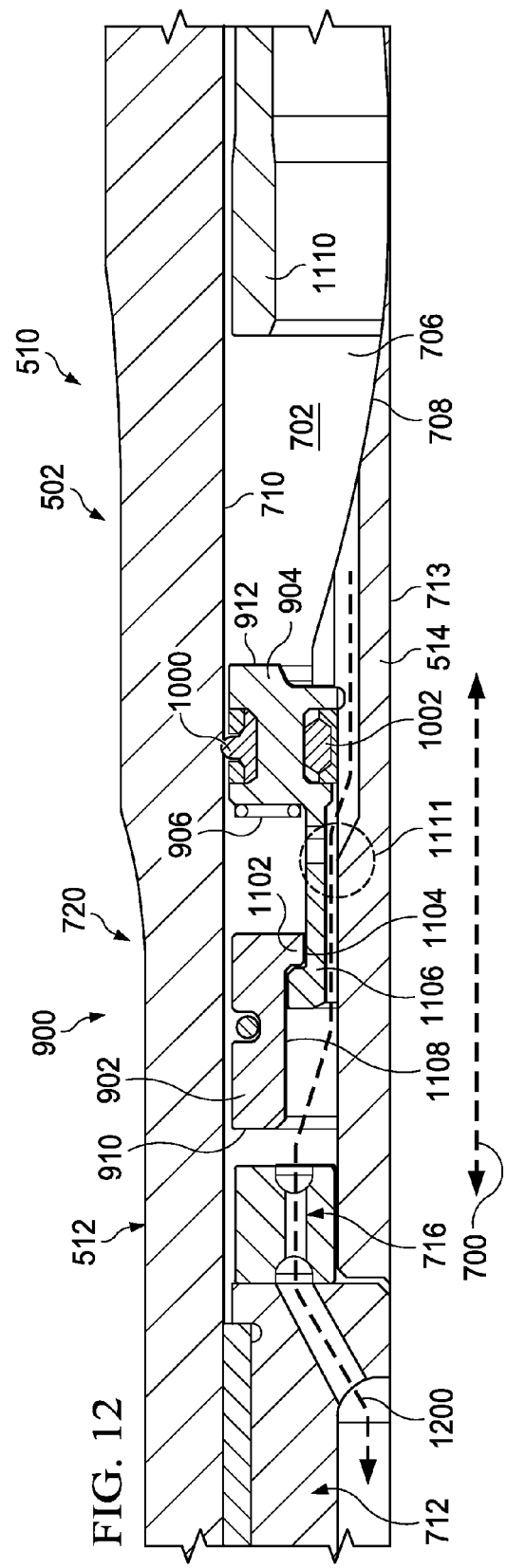

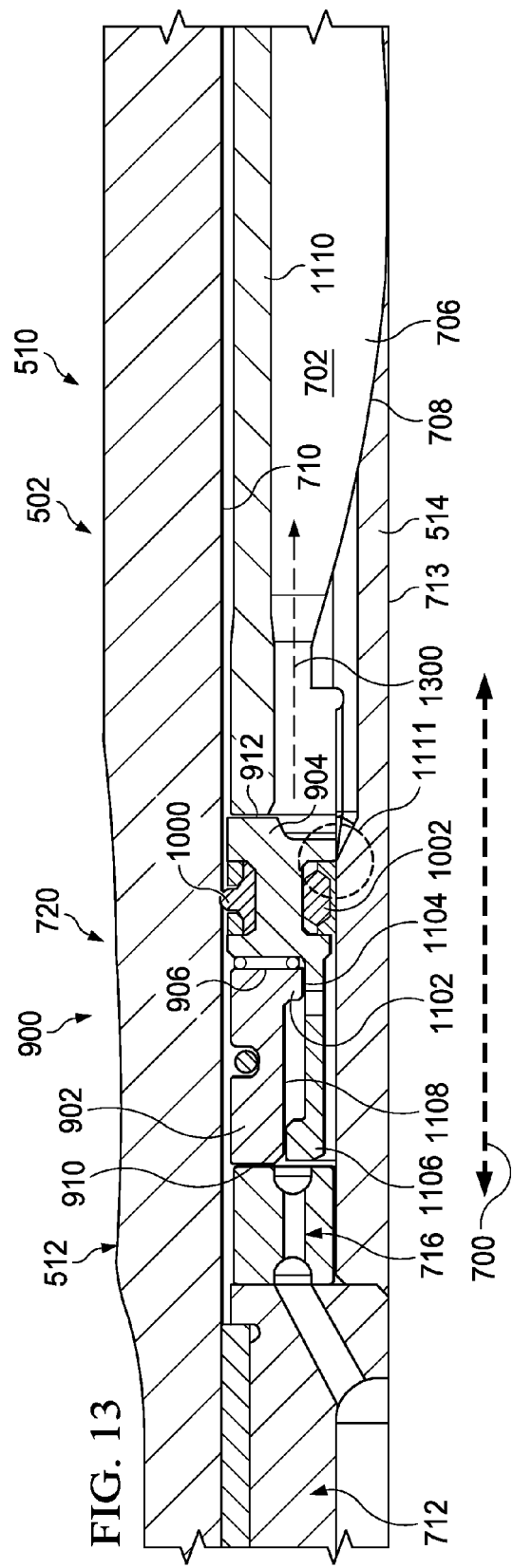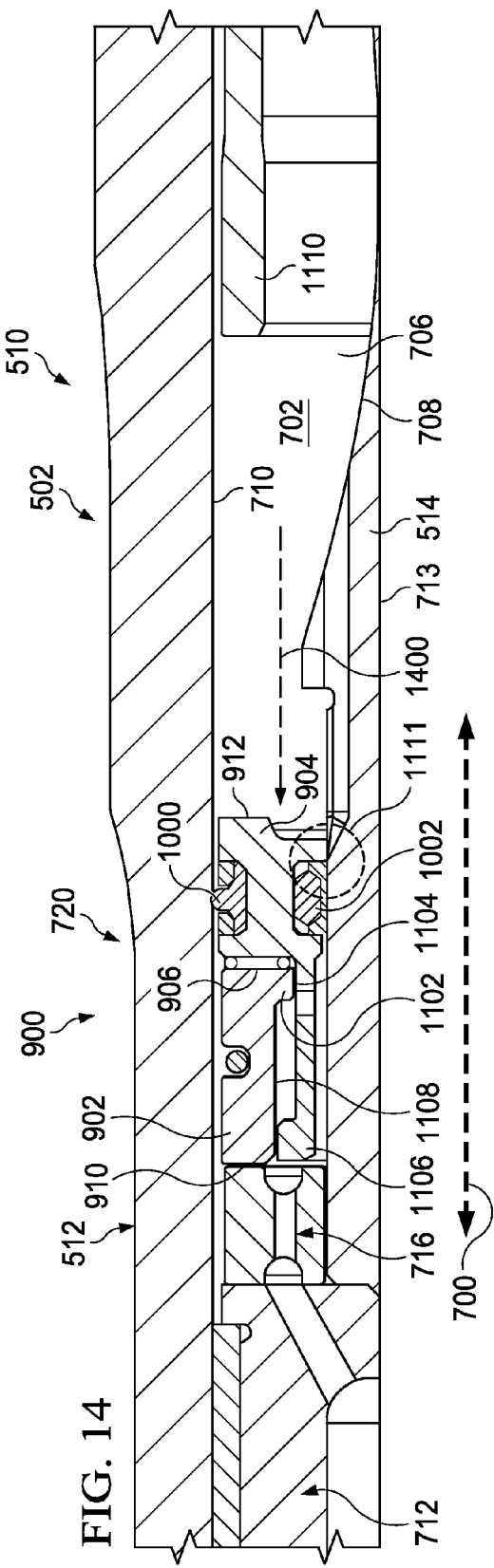

LANDING GEAR SYSTEM

BACKGROUND INFORMATION

1. Field

The present disclosure relates generally to vehicles and, in particular, to aircraft. Still more particularly, the present disclosure relates to landing gear systems for aircraft.

2. Background

A landing gear system is a structure that supports an aircraft on the ground. A landing gear system is used by an aircraft during different phases of operation, such as taxiing, takeoff, and landing. Typically, a landing gear system includes wheels and a shock absorber for use on the ground. With commercial aircraft, a landing gear system is retractable. For example, the legs and wheels attached to the legs on the landing gear system may retract into the wing and/or the fuselage of the aircraft during flight. The leg on which the wheel is attached to the aircraft is also referred to as a strut.

The length of the strut in the landing gear system may affect the performance of the aircraft. For example, when the strut has a longer length, the aircraft may be able to pivot or rotate more on takeoff. This capability may allow for the use of a less-powerful engine, less thrust during takeoff, and/or a shorter length of the runway used to takeoff. The longer length of the struts in a landing gear system, however, may result in undesired configurations in the design, maintenance, and/or operation of an aircraft.

The different advantageous embodiments take into account one or more of the issues discussed above, as well as possibly other issues.

SUMMARY

In one advantageous embodiment, an apparatus comprises a shock absorber system, a first chamber in the shock absorber system, a second chamber in the shock absorber system, and a length reduction system in the shock absorber system. The length reduction system is configured to allow a flow of a fluid between the first chamber and the second chamber when the length reduction system has a first configuration. The length reduction system is configured to substantially prevent the flow of the fluid between the first chamber and the second chamber when the length reduction system has a second configuration such that a length of the shock absorber system reduces in response to a pressure in the first chamber when the flow of the fluid is substantially prevented.

In another advantageous embodiment, an apparatus comprises a ring, a seal carrier, and a number of seals. The ring is configured to be placed between an outer cylinder and an inner cylinder. The seal carrier is configured to be placed between the outer cylinder and the inner cylinder. The seal carrier and the ring are configured to move relative to each other between a first configuration and a second configuration along an axis extending centrally through the outer cylinder and the inner cylinder. The number of seals is associated with the seal carrier. The number of seals is configured to engage an inner wall of the outer cylinder and an outer wall of the inner cylinder.

In yet another advantageous embodiment, a method is provided for changing a length of a landing gear system. A first cylinder and a second cylinder are moved relative to each other along an axis extending centrally through the first cylinder and the second cylinder such that the first cylinder and the second cylinder are in an extended position. In response to the first cylinder and the second cylinder being in the extended position, a flow of a fluid is substantially prevented between a first chamber formed between the first cylinder and the second cylinder and a second chamber within the first cylinder and the second cylinder. In response to a pressure applied to the first chamber, the first cylinder and the second cylinder are moved relative to each other along the axis such that a length of the first cylinder and the second cylinder is reduced.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 1 is an illustration of an aircraft manufacturing and service method in accordance with an advantageous embodiment;

FIG. 2 is an illustration of an aircraft in which an advantageous embodiment may be implemented;

FIG. 11 is an illustration of a more-detailed cross-sectional view of a portion of a shock absorber system in accordance with an advantageous embodiment;

FIG. 12 is an illustration of a more-detailed cross-sectional view of a portion of a shock absorber system in accordance with an advantageous embodiment;

FIG. 13 is an illustration of a more-detailed cross-sectional view of a portion of a shock absorber system in accordance with an advantageous embodiment;

FIG. 14 is an illustration of a more-detailed cross-sectional view of a portion of a shock absorber system in accordance with an advantageous embodiment.

DETAILED DESCRIPTION

Figure 3:
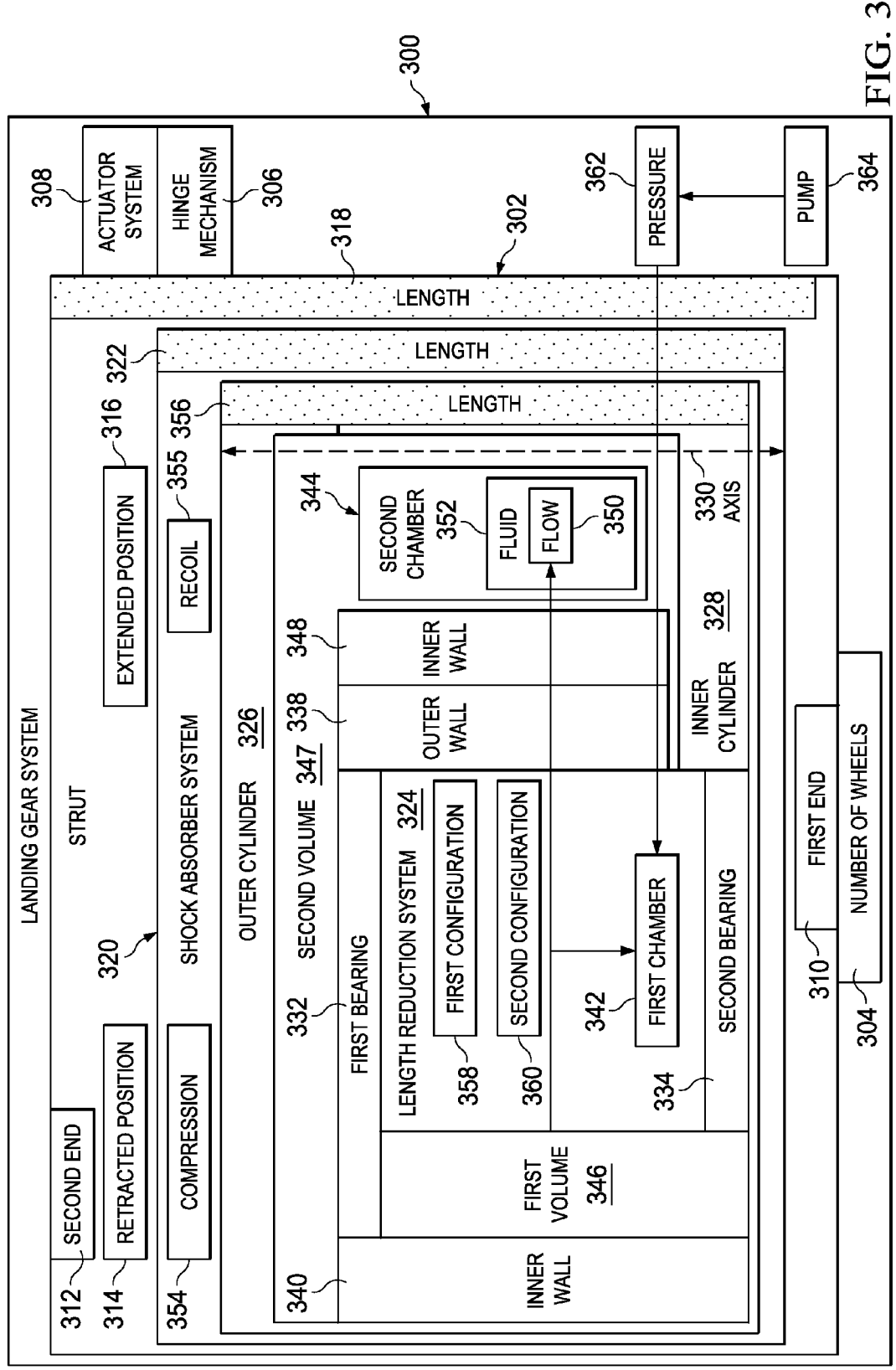
FIG. 3 is an illustration of a block diagram of a landing gear system in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and landing gear system 216. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies for landing gear system 216 produced in component and subassembly manufacturing 106 in FIG. 1 may be fabricated or manufactured in a manner similar to components or subassemblies for landing gear system 216 produced while aircraft 200 is in service 112 in FIG. 1.

As yet another example, a number of apparatus embodiments, method embodiments, or a combination thereof may be utilized during production stages, such as component and subassembly manufacturing 106 and system integration 108 in FIG. 1. A number of apparatus embodiments, method embodiments, or a combination thereof may be utilized while aircraft 200 is in service 112 and/or during maintenance and service 114 in FIG. 1. The use of a number of the different advantageous embodiments may substantially reduce the cost of aircraft 200.

The different advantageous embodiments recognize and take into account a number of different considerations. For example, the different advantageous embodiments recognize and take into account that increasing the length of struts in a landing gear system may result in undesired constraints with respect to the design of an aircraft. The different advantageous embodiments also recognize and take into account that it may be desirable to reduce the length of struts in a landing gear system for storage in an aircraft after takeoff. For example, with longer struts, the amount of space within the aircraft may be reduced.

Further, the different advantageous embodiments recognize and take into account that as the length of a strut increases, the hinge point of the strut with the wheel moves in an outward direction from the fuselage. In other words, the hinge point may be moved outwards away from the center of the aircraft. This type of design may result in loads on a wing that may be undesirable. Further, the different advantageous embodiments recognize and take into account that as the length of struts increases, the shape of the fuselage also may be affected.

Thus, the different advantageous embodiments recognize and take into account that it would be desirable to shorten the length of struts for storage when the struts are moved to a retracted position during flight. The different advantageous embodiments recognize and take into account that a retractable jack may be used to extend and retract the landing gear. The different advantageous embodiments recognize and take into account that with this type of retraction, the actuator system uses an external actuator that may require additional space within the aircraft.

The different advantageous embodiments also recognize and take into account that another solution may involve adding another structure to the strut to pull in or reduce the length of the strut. For example, a third cylinder may be placed around a shock absorber to pull the shock absorber into a retracted position. The different advantageous embodiments recognize and take into account that this type of solution increases the weight of the strut and also requires an actuator to be external to the strut to reduce the length of the strut.

Thus, the different advantageous embodiments provide a method and apparatus for shortening the length of components in a landing gear system. One or more of the advantageous embodiments includes an apparatus that comprises a shock absorber system, a first chamber in the shock absorber system, a second chamber in the shock absorber system, and a length reduction system in the shock absorber system.

The length reduction system is configured to allow a flow of fluid from the first chamber into the second chamber during compression of the shock absorber system. This flow occurs when the length reduction system has a first configuration. This flow also may occur when an aircraft lands or places a load on the shock absorber system. The length reduction system is configured to substantially prevent the flow of fluid from the first chamber into the second chamber when the length reduction system has a second configuration. In this second configuration, the length of the shock absorber system may be reduced in response to pressure in the first chamber when the flow is substantially prevented in the second configuration. The second configuration may occur when the landing gear is retracted or moved into a stowed position.

With reference now to FIG. 3, an illustration of a block diagram of a landing gear system is depicted in accordance with an advantageous embodiment. Landing gear system 300 is an example of one manner in which landing gear system 216 for aircraft 200 in FIG. 2 may be implemented. As depicted, landing gear system 300 includes strut 302, number of wheels 304, hinge mechanism 306, and actuator system 308.

Strut 302 is an elongate member that may have multiple components. Strut 302 has number of wheels 304 connected to strut 302 at first end 310 of strut 302. Second end 312 of strut 302 is associated or moveably connected to an aircraft. Hinge mechanism 306 is configured to guide strut 302 to rotatably move between retracted position 314 and extended position 316. Actuator system 308 causes strut 302 to move between retracted position 314 and extended position 316.

In these illustrative examples, strut 302 has length 318. The different advantageous embodiments reduce length 318 of strut 302 when strut 302 is moved from extended position 316 to retracted position 314. In this manner, the amount of room or space needed to store strut 302 and number of wheels 304 may be reduced.

In these illustrative examples, strut 302 includes shock absorber system 320. Length 318 is reduced, in these illustrative examples, by reducing length 322 of shock absorber system 320. As illustrated, length reduction system 324 in shock absorber system 320 is configured to reduce length 322 of shock absorber system 320.

As depicted, shock absorber system 320 comprises outer cylinder 326 and inner cylinder 328. In these illustrative examples, inner cylinder 328 and outer cylinder 326 are concentric to each other. In other words, inner cylinder 328 and outer cylinder 326 share the same center through which axis 330 extends in these depicted examples. Inner cylinder 328 is located within outer cylinder 326. In this manner, axis 330 extends centrally through inner cylinder 328 and outer cylinder 326 in these examples. Inner cylinder 328 and outer cylinder 326 are configured to move relative to each other along axis 330.

In these depicted examples, shock absorber system 320 also comprises first bearing 332 and second bearing 334. In these illustrative examples, a bearing is a device that is configured to constrain relative motion between two or more components. First bearing 332 and second bearing 334 are configured to constrain relative motion between outer cylinder 326 and inner cylinder 328.

First bearing 332 and second bearing 334 are located with respect to inner cylinder 328 and outer cylinder 326. In these examples, first bearing 332 and second bearing 334 are located between inner cylinder 328 and outer cylinder 326. In particular, first bearing 332 and second bearing 334 are located between outer wall 338 of inner cylinder 328 and inner wall 340 of outer cylinder 326.

For example, in one advantageous embodiment, first bearing 332 is connected to outer cylinder 326 between outer cylinder 326 and inner cylinder 328. Further, in this embodiment, second bearing 334 is connected to inner cylinder 328 between outer cylinder 326 and inner cylinder 328. Of course, in other examples, first bearing 332 may be connected to outer cylinder 326 and/or inner cylinder 328, while second bearing 334 may be connected to inner cylinder 328 and/or outer cylinder 326.

First volume 346 between first bearing 332, second bearing 334, outer wall 338 of inner cylinder 328, and inner wall 340 of outer cylinder 326 forms first chamber 342. Second volume 347 within inner wall 348 of inner cylinder 328 and within inner wall 340 of outer cylinder 326 outside of first volume 346 forms second chamber 344.

Length reduction system 324 is configured to allow flow 350 of fluid 352 between first chamber 342 to second chamber 344 during compression 354 of shock absorber system 320. In these examples, fluid 352 is hydraulic fluid that is selected for use in shock absorber system 320.

In the different illustrative examples, compression 354 may occur when a load is applied to landing gear system 300. For example, when an aircraft, such as aircraft 200 in FIG. 2, lands or moves on the ground, a load is applied to landing gear system 300. Compression 354 may occur in response to this load.

Additionally, recoil 355 of shock absorber system 320 occurs when shock absorber system 320 is not in compression 354. In other words, when the load is reduced or no longer applied to landing gear system 300, shock absorber system 320 may be in recoil 355. Recoil 355 may include a normal state for shock absorber system 320 when a load is not being applied to landing gear system 300.

In these examples, compression 354 of shock absorber system 320 includes a reduction in length 356 of outer cylinder 326 and inner cylinder 328. Length 356 is a measurement of the length of the combination of outer cylinder 326 and inner cylinder 328 along axis 330.

Flow 350 of fluid 352 between first chamber 342 and second chamber 344 is allowed to occur by length reduction system 324 when length reduction system 324 has first configuration 358. In other words, first configuration 358 for length reduction system 324 is a configuration that allows fluid 352 to flow from first chamber 342 into second chamber 344 and/or from second chamber 344 into first chamber 342.

In particular, length reduction system 324 has first configuration 358 during compression 354. When length reduction system 324 has first configuration 358 during compression 354, flow 350 of fluid 352 occurs from second chamber 344 into first chamber 342.

Additionally, length reduction system 324 has first configuration 358 during recoil 355. When length reduction system 324 has first configuration 358 during recoil 355, flow 350 of fluid 352 occurs from first chamber 342 into second chamber 344.

When length reduction system 324 has second configuration 360, flow 350 of fluid 352 between first chamber 342 and second chamber 344 is substantially prevented by length reduction system 324. In particular, flow 350 of fluid 352 from second chamber 344 into first chamber 342 is substantially prevented by length reduction system 324. Substantially preventing flow 350 means that flow 350 of fluid 352 does not occur at all or that flow 350 of fluid 352 is such that pressure 362 applied to first chamber 342 causes length 322 of shock absorber system 320 to be reduced. In particular, length 356 of outer cylinder 326 and inner cylinder 328 is reduced.

In the illustrative examples, this reduction in length 356 occurs in response to a sufficient amount of pressure 362 being applied. In these illustrative examples, pump 364 in landing gear system 300 causes pressure 362 in first chamber 342 by pumping a selected volume of suitable fluid into first chamber 342.

The volume of suitable fluid is selected based on the desired amount of pressure 362 to be generated in first chamber 342. In these depicted examples, the suitable fluid may be a hydraulic fluid, such as, for example, without limitation, a petroleum-base hydraulic fluid, a Skydrol® Type IV hydraulic fluid manufactured by Solutia Incorporated, or some other suitable type of hydraulic fluid.

Further, when shock absorber system 320 is in recoil 355, flow 350 of fluid 352 may flow from first chamber 342 into second chamber 344. Recoil 355 may occur in response to compression 354 of shock absorber system 320 in these examples.

In these illustrative examples, number of wheels 304 is connected to inner cylinder 328. As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

The illustration of landing gear system 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in the depicted examples, only strut 302 is illustrated. In other illustrative examples, landing gear system 300 may include additional struts in addition to strut 302 in which each of the additional struts may include a length reduction system, such as length reduction system 324 in strut 302. In yet other illustrative examples, some of the other additional struts may not include a length reduction system.

In this manner, the different advantageous embodiments provide a method and apparatus for reducing the length of a landing gear system between a retracted position and an extended position. In the different illustrative examples, the reduction in length of the landing gear system occurs without requiring components that may use additional space within the aircraft. In the different illustrative examples, length reduction system 324 is configured to be located within shock absorber system 320 and uses existing components within shock absorber system 320 to reduce length 318 of landing gear system 300.

Figure 4:
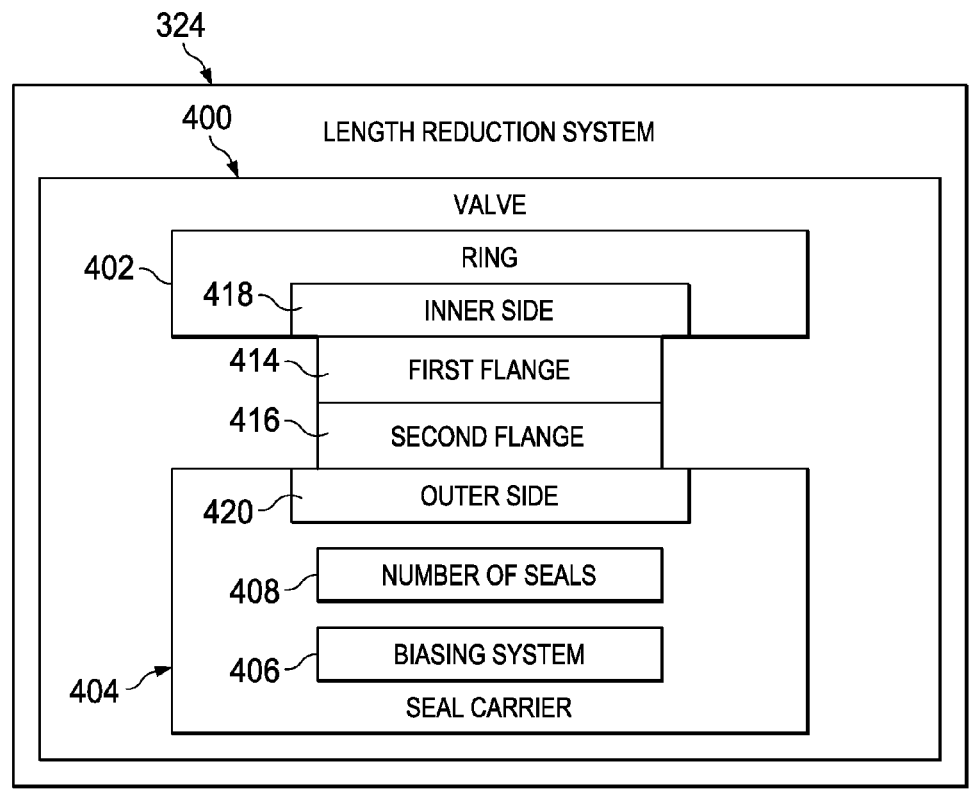
FIG. 4 is an illustration of a block diagram of a length reduction system in accordance with an advantageous embodiment.

With reference now to FIG. 4, an illustration of a block diagram of a length reduction system is depicted in accordance with an advantageous embodiment. Length reduction system 324 is shown in more detail in this figure. In this illustrative example, length reduction system 324 takes the form of valve 400. Valve 400 comprises ring 402, seal carrier 404, biasing system 406, and number of seals 408 in these depicted examples.

Ring 402 is a structure that is configured to be placed between outer cylinder 326 and inner cylinder 328 in FIG. 3. In a similar fashion, seal carrier 404 is a structure that is also configured to be placed between outer cylinder 326 and inner cylinder 328.

Ring 402 and seal carrier 404 are configured to move relative to each other along axis 330 in FIG. 3. Ring 402 and seal carrier 404 move relative to each other when length reduction system 324 changes between first configuration 358 and second configuration 360 in FIG. 3.

In these illustrative examples, biasing system 406 is associated with seal carrier 404. A first component may be considered to be associated with a second component by being secured to the second component, bonded to the second component, fastened to the second component, and/or connected to the second component in some other suitable manner. The first component also may be connected to the second component using a third component. The first component may also be considered to be associated with the second component by being formed as part of and/or an extension of the second component.

In other illustrative examples, biasing system 406 may be associated with ring 402 or both ring 402 and seal carrier 404, depending on the particular implementation. In these depicted examples, biasing system 406 comprises at least one of a spring, a belleville washer, a split ring washer, and/or other suitable types of biasing mechanisms.

Additionally, number of seals 408 is also associated with seal carrier 404. Number of seals 408 is configured to substantially prevent flow 350 of fluid 352 between first chamber 342 and second chamber 344 in FIG. 3. In these illustrative examples, number of seals 408 may take various forms. For example, number of seals 408 may include at least one of an O-ring seal, a T-shaped seal, a cap seal, and other suitable types and/or shapes of seals. Number of seals 408 may be comprised of different types of materials. For example, number of seals 408 may be comprised of plastic, nylon, silicone, rubber, a thermoplastic elastomer, polyurethane, polyamide, and/or other suitable types of materials.

When ring 402 and seal carrier 404 move towards each other, length reduction system 324 changes from first configuration 358 to second configuration 360 in FIG. 3. When second configuration 360 is reached, number of seals 408 associated with seal carrier 404 substantially prevents flow 350 of fluid 352 between first chamber 342 into second chamber 344.

In these illustrative examples, ring 402 has first flange 414, and seal carrier 404 has second flange 416. First flange 414 extends from inner side 418 of ring 402. Second flange 416 extends from outer side 420 of seal carrier 404. In these illustrative examples, first flange 414 and second flange 416 are configured to engage each other such that contact is maintained between ring 402 and seal carrier 404 during movement of ring 402 and seal carrier 404 relative to each other.

The illustration of length reduction system 324 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments.

For example, in some illustrative examples, length reduction system 324 may not include ring 402. Instead, seal carrier 404 may be configured to move freely within first chamber 342 in response to flow 350 of fluid 352 in first chamber 342 to move length reduction system 324 between first configuration 358 and second configuration 360. In other illustrative examples, length reduction system 324 may include other components, such as, for example, structural components.

Figure 5:
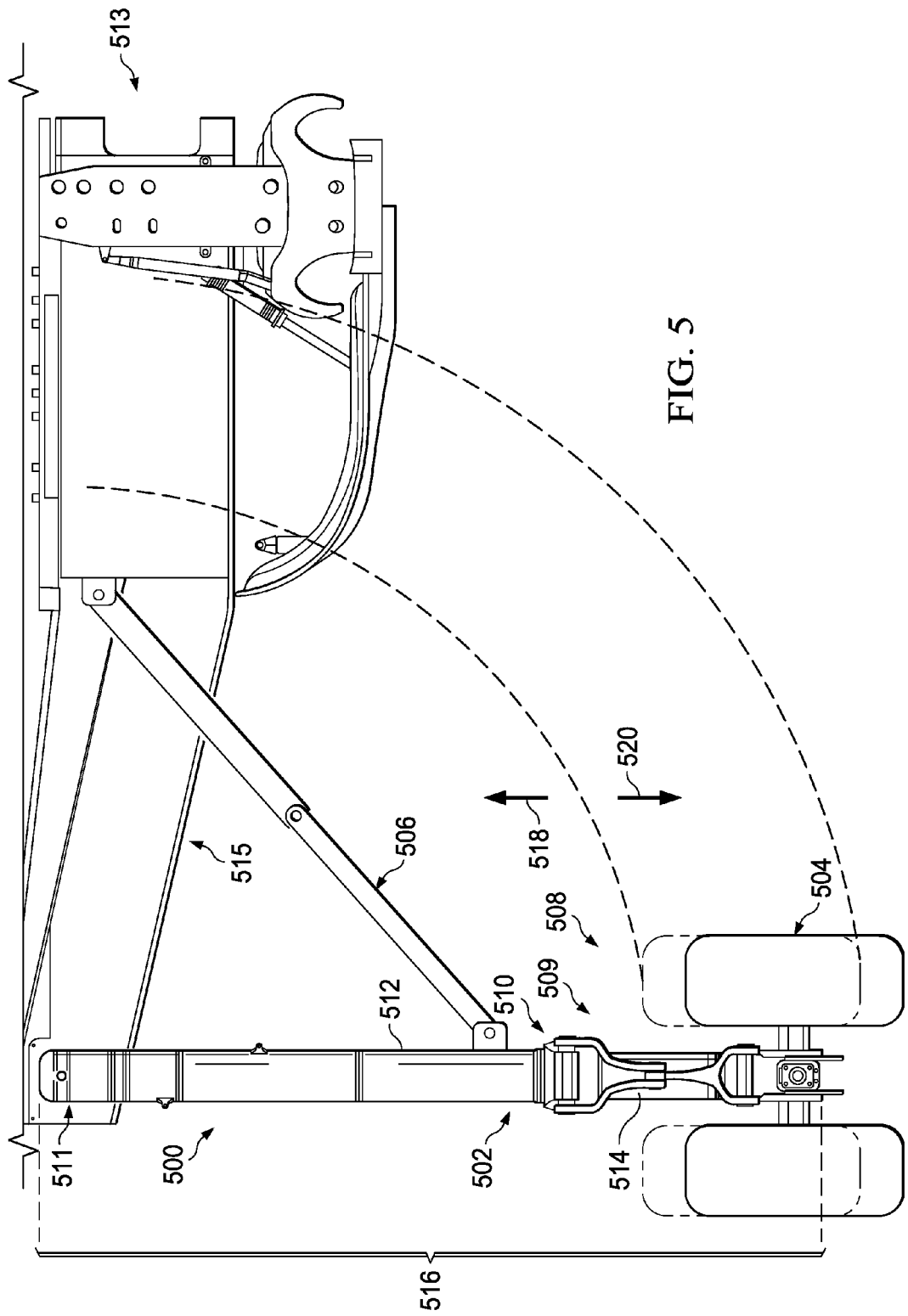
FIG. 5 is an illustration of a landing gear system in accordance with an advantageous embodiment.

With reference now to FIG. 5, an illustration of a landing gear system is depicted in accordance with an advantageous embodiment. Landing gear system 500 is an example of one implementation for landing gear system 300 in FIG. 3. The different components shown in FIGS. 5-14 may be components in FIG. 3, comprised of components in FIG. 3, combined with components in FIG. 3, and/or used with components in FIG. 3. Additionally, some of the components in FIGS. 5-14 may be illustrative examples of how components shown in block form in FIG. 3 can be implemented as physical structures.

Landing gear system 500 comprises strut 502, wheels 504, and hinge system 506. An actuator system (not shown) may cause hinge system 506 to move strut 502 into different positions.

In this illustrative example, landing gear system 500 is in deployed position 508. When landing gear system 500 is in deployed position 508, strut 502 is in extended position 509. As illustrated, strut 502 includes shock absorber system 510. Shock absorber system 510 has end 511 rotatably connected to aircraft 513 having landing gear system 500. In particular, shock absorber system 510 is connected to wing 515 of aircraft 513.

As depicted, shock absorber system 510 has outer cylinder 512 and inner cylinder 514. Outer cylinder 512 and inner cylinder 514 have length 516. Length 516 is an example of length 356 for outer cylinder 326 and inner cylinder 328 in FIG. 3. Length 516 is a relative length for outer cylinder 512 and inner cylinder 514. In other words, length 516 changes, depending on the movement of inner cylinder 514 relative to outer cylinder 512.

For example, length 516 is reduced when inner cylinder 514 moves towards outer cylinder 512 in the direction of arrow 518. Length 516 is increased when inner cylinder 514 moves away from outer cylinder 512 in the direction of arrow 520. In these illustrative examples, it is desirable to reduce length 516 when landing gear system 500 moves out of deployed position 508. A reduction in length 516 reduces the length of shock absorber system 510, and thereby reduces the length of strut 502.

Figure 6:
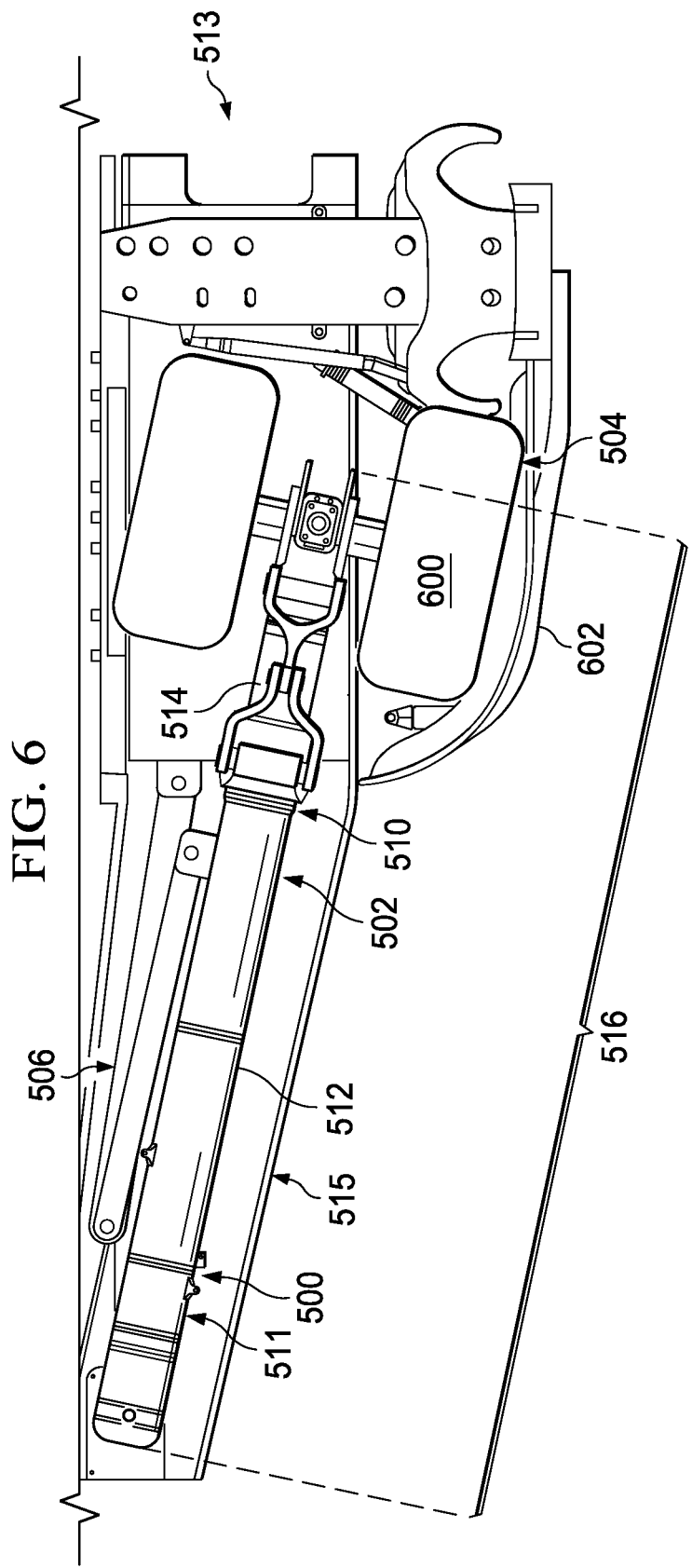
FIG. 6 is an illustration of a landing gear system in accordance with an advantageous embodiment.

With reference now to FIG. 6, an illustration of a landing gear system is depicted in accordance with an advantageous embodiment. In this illustrative example, landing gear system 500 from FIG. 5 is in stowed position 600. As depicted, landing gear system 500 is stowed away for storage inside fuselage 602 of aircraft 513.

Figure 7:
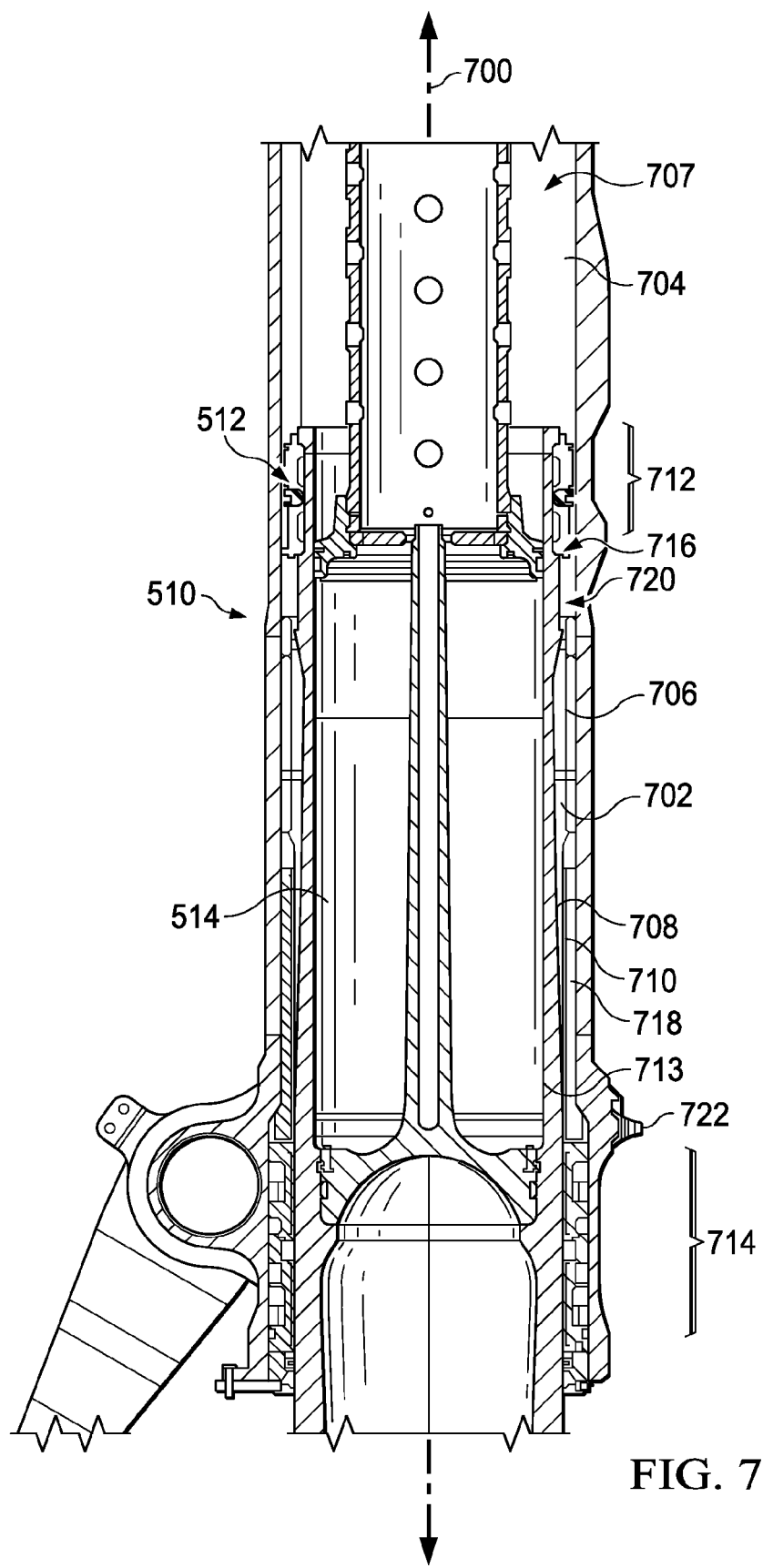
FIG. 7 is an illustration of a more-detailed cross-sectional view of a shock absorber system in accordance with an advantageous embodiment.

With reference now to FIG. 7, an illustration of a more-detailed cross-sectional view of a shock absorber system is depicted in accordance with an advantageous embodiment. In this illustrative example, a more-detailed view of shock absorber system 510 from FIG. 5 is shown. In this illustrative example, outer cylinder 512 and inner cylinder 514 may move relative to each other along axis 700. Additionally, as depicted, outer cylinder 512 and inner cylinder 514 are concentric to each other. In particular, inner cylinder 514 is located inside of outer cylinder 512.

In this illustrative example, first chamber 702 and second chamber 704 are present within shock absorber system 510. First chamber 702 is formed by first volume 706. In this depicted example, first volume 706 is defined by outer wall 708 of inner cylinder 514, inner wall 710 of outer cylinder 512, first bearing 712, and second bearing 714.

In this illustrative example, first bearing 712 is connected to inner cylinder 514. Second bearing 714 is connected to outer cylinder 512. First bearing 712 and second bearing 714 are configured to constrain movement of outer cylinder 512 relative to inner cylinder 514.

Second chamber 704 is formed by second volume 707. Second volume 707 includes the volume within inner wall 713 of inner cylinder 514 and within inner wall 710 of outer cylinder 512 that is outside of first volume 706. In other words, second volume 707 includes the volume within inner wall 710 of outer cylinder 512 that is above first bearing 712.

Additionally, valve 716 is adjacent to first bearing 712. Valve 716 is configured to control flow of fluid 718 between first chamber 702 and second chamber 704. In these illustrative examples, valve 716 takes the form of a recoil valve. Valve 716 is configured such that recoil fluid is allowed to flow more easily from second chamber 704 into first chamber 702 as compared to flowing from first chamber 702 back into second chamber 704. This configuration of valve 716 may be used to reduce the number of oscillations that may occur when shock absorber system 510 is compressed and decompressed upon application of a load. This load may be, for example, an aircraft landing on a runway.

In this illustrative example, length reduction system 720 is configured to reduce the length of strut 502 through the reduction in length 516 of outer cylinder 512 and inner cylinder 514 of shock absorber system 510.

Additionally, in this illustrative example, fluid may be pumped into first chamber 702 using pump 722. Pump 722 may be used to apply pressure to length reduction system 720 in first chamber 702.

Figure 8:
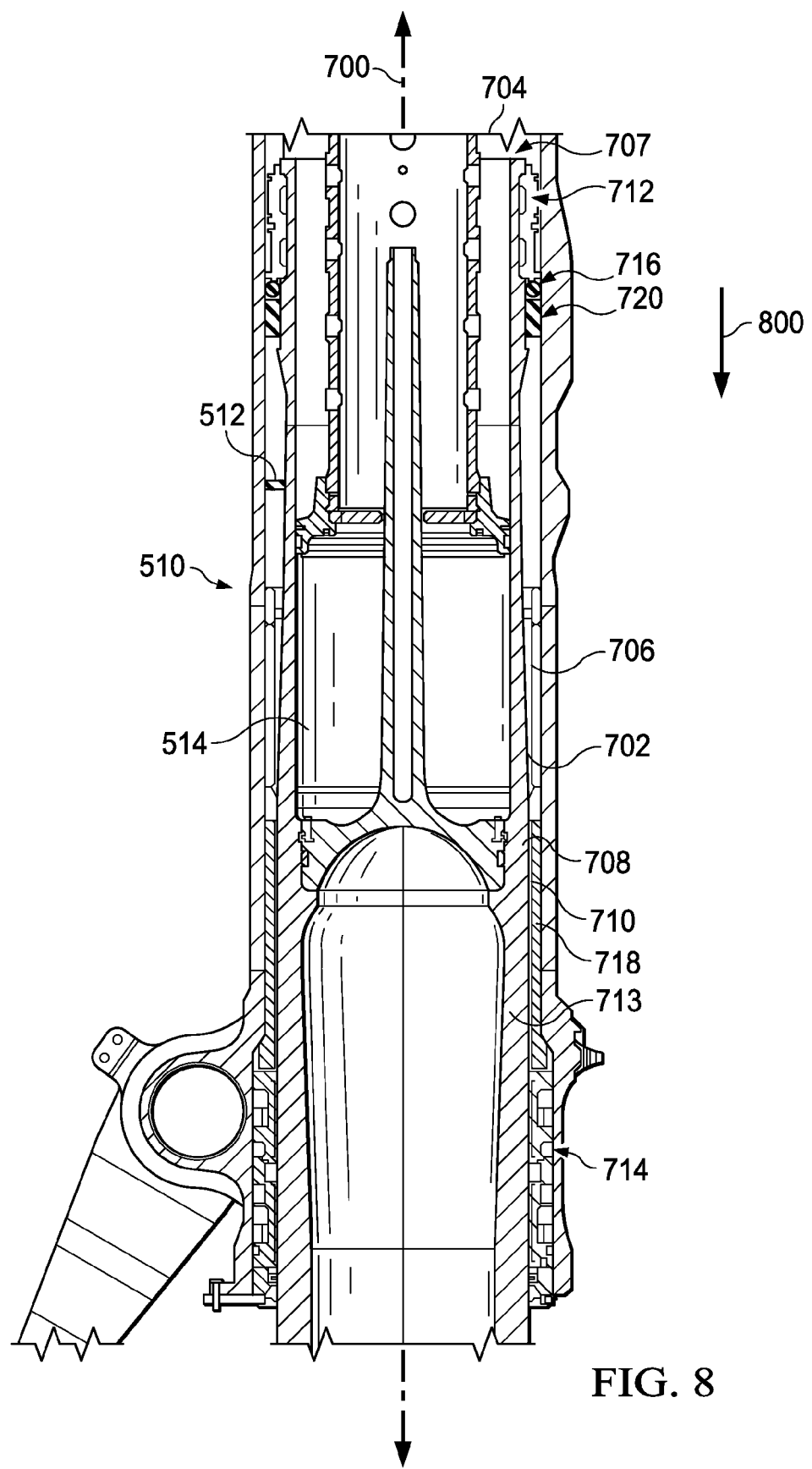
FIG. 8 is an illustration of a more-detailed cross-sectional view of a shock absorber system in a compressed state in accordance with an advantageous embodiment.

With reference now to FIG. 8, an illustration of a more detailed cross-sectional view of a shock absorber system in a compressed state is depicted in accordance with an advantageous embodiment. In this illustrative example, shock absorber system 510 is shown with compression. In this example, oil flows in the direction of arrow 800 from second chamber 704 into first chamber 702.

Figure 9:
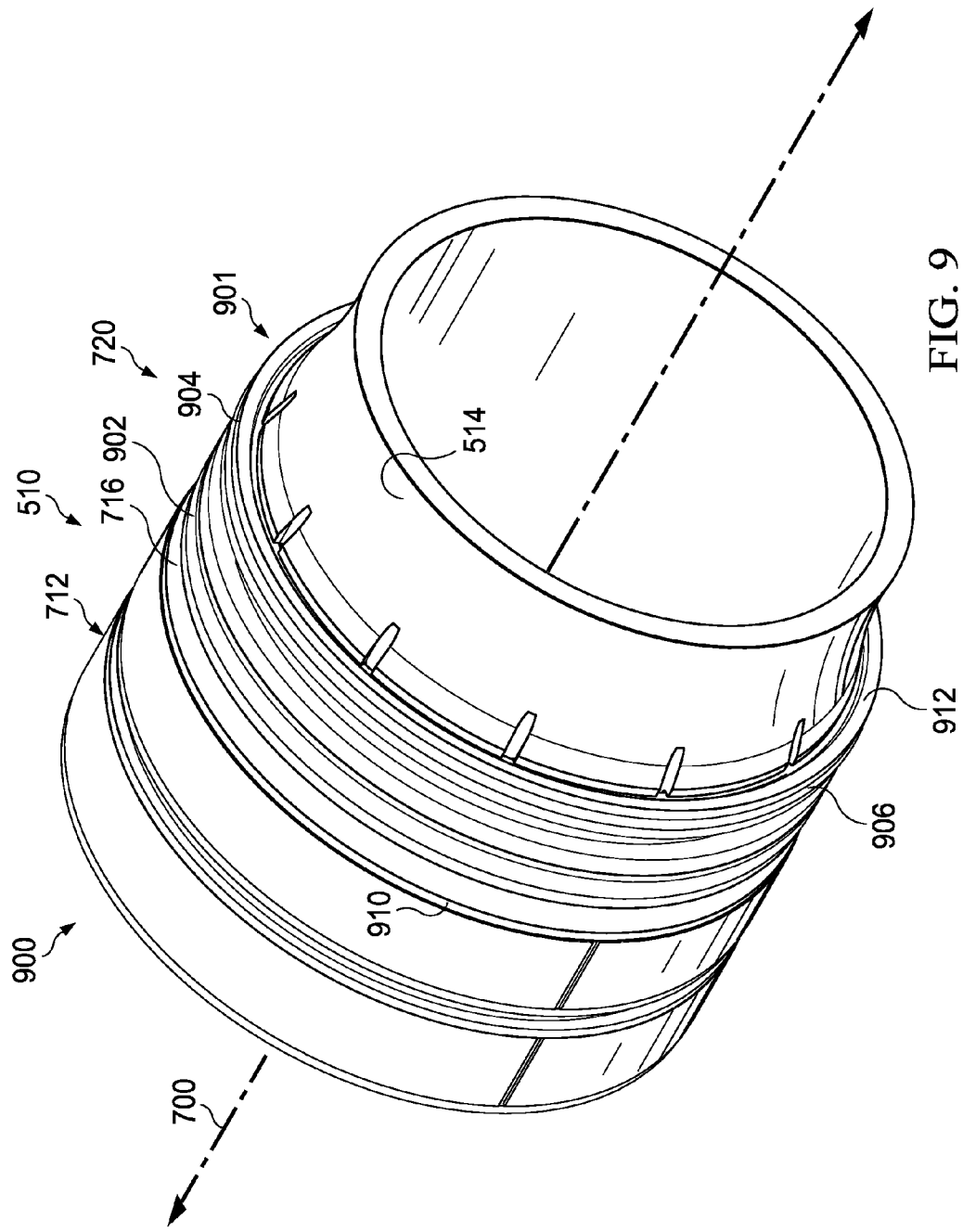
FIG. 9 is an illustration of a perspective view of a portion of a shock absorber system in accordance with an advantageous embodiment.

With reference now to FIG. 9, an illustration of a perspective view of a portion of a shock absorber system is depicted in accordance with an advantageous embodiment. In this illustrative example, portion 900 of shock absorber system 510 from FIGS. 5-8 is depicted without outer cylinder 512. In particular, portion 900 includes first bearing 712, valve 716, a portion of inner cylinder 514, and length reduction system 720.

As depicted, length reduction system 720 takes the form of valve 901. Valve 901 comprises ring 902, seal carrier 904, and biasing system 906 around inner cylinder 514.

Ring 902 and seal carrier 904 may move relative to each other along axis 700 through valve 901. Ring 902 is at first end 910 of valve 901. Seal carrier 904 is at second end 912 of valve 901. Together, ring 902 and seal carrier 904 may be referred to as a seal cartridge.

Figure 10:
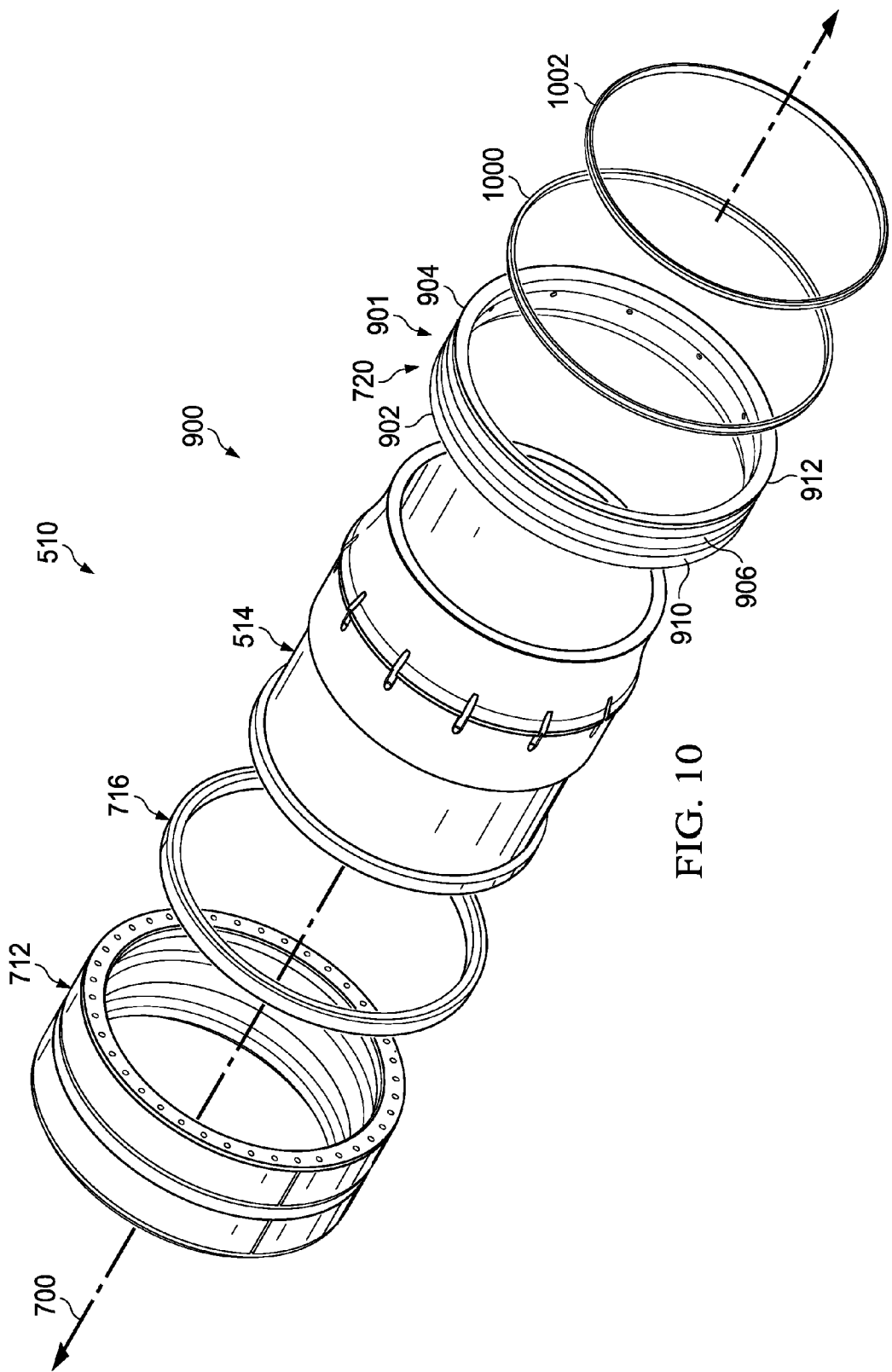
FIG. 10 is an illustration of an exploded perspective view of a length reduction system in accordance with an advantageous embodiment.

With reference now to FIG. 10, an illustration of an exploded perspective view of a length reduction system is depicted in accordance with an advantageous embodiment. In this illustrative example, portion 900 of shock absorber system 510 from FIG. 9 is seen in an exploded view. As depicted in this view, length reduction system 720 includes first seal 1000 and second seal 1002. Seal carrier 904 is configured to hold first seal 1000 and second seal 1002. First seal 1000 is configured to engage inner wall 710 of outer cylinder 512 (not shown). Second seal 1002 is configured to engage outer wall 708 of inner cylinder 514.

With reference now to FIG. 11, an illustration of a more-detailed cross-sectional view of a portion of a shock absorber system is depicted in accordance with an advantageous embodiment. In this illustrative example, shock absorber system 510 is in compression. Fluid is allowed to flow from second chamber 704 in FIG. 7 into first chamber 702 during compression of shock absorber system 510. In particular, fluid is allowed to flow from second chamber 704 through valve 716 into first chamber 702 in the direction of arrow 1100.

Further, in this illustrative example, biasing system 906 is configured to substantially prevent second seal 1002 carried by seal carrier 904 from fully engaging portion 1111 of inner cylinder 514 such that the flow of the fluid is allowed between second chamber 704 and first chamber 702. When second seal 1002 fully engages portion 1111 of inner cylinder 514, fluid is substantially prevented from flowing between second chamber 704 and first chamber 702.

As depicted, the flow of fluid through valve 716 moves valve 716 towards ring 902. Ring 902 has first flange 1102 at inner side 1104 of ring 902. Seal carrier 904 has second flange 1106 at outer side 1108 of seal carrier 904. First flange 1102 and second flange 1106 are configured to engage when ring 902 and seal carrier 904 move towards each other.

Additionally, in this illustrative example, shock absorber system 510 includes tube 1110. Tube 1110 may be, for example, a spacer tube. In this illustrative example, tube 1110 is located inside of and connected to outer cylinder 512. Tube 1110 is located away from length reduction system 720 when shock absorber system 510 is in compression in this illustrative example. In other words, tube 1110 does not engage length reduction system 720 when shock absorber system 510 is in compression. As depicted, length reduction system 720 is located between valve 716 at first bearing 712 and tube 1110.

Turning now to FIG. 12, an illustration of a more-detailed cross-sectional view of a portion of a shock absorber system is depicted in accordance with an advantageous embodiment. In this illustrative example, shock absorber system 510 is in recoil. During recoil, fluid is allowed to flow from first chamber 702 into second chamber 704 from FIG. 7. In particular, fluid is allowed to flow from first chamber 702 through valve 716 into second chamber 704 in the direction of arrow 1200. As depicted, the flow of fluid through valve 716 moves valve 716 into contact with first bearing 712.

Further, as illustrated, biasing system 906 substantially prevents second seal 1002 from fully engaging portion 1111 of inner cylinder 514 such that the flow of fluid is allowed between first chamber 702 and second chamber 704 in this example. Further, tube 1110 does not engage length reduction system 720 when shock absorber system 510 is in recoil.

With reference now to FIG. 13, an illustration of a more-detailed cross-sectional view of a portion of a shock absorber system is depicted in accordance with an advantageous embodiment. In this illustrative example, inner cylinder 514 has moved relative to outer cylinder 512 in the direction of arrow 1300. Inner cylinder 514 has moved to move strut 502 into an extended position.

Further, as depicted, first bearing 712 is connected to inner cylinder 514 such that movement of inner cylinder 514 moves first bearing 712.

As depicted, when inner cylinder 514 is moved in the direction of arrow 1300, length reduction system 720 engages tube 1110. In particular, seal carrier 904 of length reduction system 720 engages tube 1110. When seal carrier 904 engages tube 1110, seal carrier 904 is prevented from further moving in the direction of arrow 1300.

With seal carrier 904 blocked by tube 1110, first bearing 712, which is connected to inner cylinder 514, moves with inner cylinder 514 in the direction of arrow 1300 to push valve 716 towards ring 902. Valve 716, which is pressing against ring 902, causes ring 902 to compress biasing system 906 such that ring 902 moves toward seal carrier 904. Further, with valve 716 pressed against ring 902 and ring 902 pressed against seal carrier 904, inner cylinder 514 moves in the direction of arrow 1300 such that portion 1111 of inner cylinder 514 fully engages second seal 1002.

In this manner, second seal 1002 fully engages portion 1111 of inner cylinder 514 to substantially prevent the flow of fluid between first chamber 702 and second chamber 704. In this manner, the flow of fluid through first chamber 702 is substantially prevented when strut 502 is in the extended position. In particular, the flow of fluid between first chamber 702 and second chamber 704 in FIG. 7 is substantially prevented when strut 502 is extended.

With reference now to FIG. 14, an illustration of a more-detailed cross-sectional view of a portion of a shock absorber system is depicted in accordance with an advantageous embodiment. In this illustrative example, pressure may be applied to length reduction system 720 in the direction of arrow 1400 to move strut 502 into a compressed state. This pressure may be applied by pumping fluid into first chamber 702 through, for example, pump 722 in FIG. 7. The fluid may be, for example, hydraulic fluid.

As depicted, when pressure is applied to length reduction system 720, seal carrier 904 moves towards ring 902, and ring 902 moves towards valve 716. In this manner, the flow of fluid between first chamber 702 and second chamber 704 in FIG. 7 is substantially prevented while strut 502 is moved into the compressed state.

Figure 15:
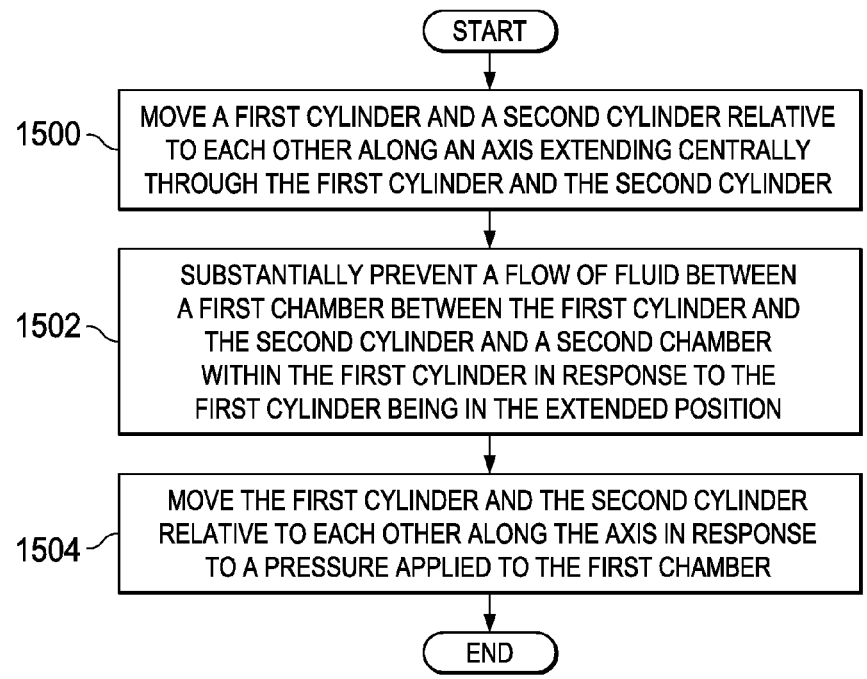
FIG. 15 is an illustration of a flowchart of a process for changing a length of a landing gear system in accordance with an advantageous embodiment.

With reference now to FIG. 15, an illustration of a flowchart of a process for changing a length of a landing gear system is depicted in accordance with an advantageous embodiment. The process illustrated in FIG. 15 may be implemented using landing gear system 300 in FIG. 3.

The process begins by moving a first cylinder and a second cylinder relative to each other along an axis extending centrally through the first cylinder and the second cylinder (operation 1500). The first cylinder and the second cylinder are part of a shock absorber system in a strut. In this illustrative example, the first cylinder and the second cylinder are concentric to each other. The second cylinder is located in the first cylinder.

The first cylinder and the second cylinder are moved such that the first cylinder and the second cylinder are in an extended position. In other words, the strut is moved into an extended position when the first cylinder and the second cylinder are moved in operation 1500. The first cylinder may be, for example, outer cylinder 326 in FIG. 3, or outer cylinder 512 in FIGS. 5-8 and 11-14. The second cylinder may be, for example, inner cylinder 328 in FIG. 3, or inner cylinder 514 in FIGS. 5-14.

Thereafter, the process substantially prevents a flow of fluid between a first chamber between the first cylinder and the second cylinder and a second chamber within the first cylinder in response to the first cylinder being in the extended position (operation 1502). The process then moves the first cylinder and the second cylinder relative to each other along the axis in response to a pressure applied to the first chamber (operation 1504), with the process terminating thereafter. The first cylinder and the second cylinder are moved such that a length of the first cylinder and the second cylinder is reduced. In this manner, in operation 1504, the first cylinder and the second cylinder are moved to move the strut into a retracted position.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for shortening or reducing the length of components in a landing gear system. One or more of the advantageous embodiments includes an apparatus that comprises a shock absorber system, a first chamber in the shock absorber system, a second chamber in the shock absorber system, and a length reduction system in the shock absorber system.

The length reduction system is configured to allow a flow of fluid from the first chamber into the second chamber during compression of the shock absorber system. This flow occurs when the length reduction system has a first configuration. This flow also may occur when an aircraft lands or places a load on the shock absorber system. The length reduction system is configured to substantially prevent the flow of fluid from the first chamber into the second chamber when the length reduction system has a second configuration. In this second configuration, the length of the shock absorber system may be reduced in response to pressure in the first chamber when the flow is substantially prevented in the second configuration. The second configuration may occur when the landing gear is retracted or moved into a stowed position.

In this manner, the different advantageous embodiments provide a length reduction system that reduces the length of the strut for a landing gear system for an aircraft without increasing the weight and/or complexity of the landing gear system in an undesired manner.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a shock absorber system comprising an inner cylinder located within an outer cylinder such that the inner cylinder and the outer cylinder move relative to each other along an axis extending centrally through the inner cylinder and the outer cylinder;
   a first chamber in the shock absorber system;
   a second chamber in the shock absorber system; and
   a length reduction system located between the inner cylinder and the outer cylinder and between the first chamber and the second chamber, the length reduction system comprising:
   a seal carrier located between the outer cylinder and the inner cylinder;
   a first seal and a second seal in the seal carrier, such that the first seal engages an inner wall of the outer cylinder and forms a partial separation between the first chamber and the second chamber, and the second seal avoids contact with an outer wall of the inner cylinder and allows a fluid flow between the first chamber and the second chamber when the length reduction system is in a first configuration, and such that with the inner cylinder extended from the outer cylinder, a tube inside the outer cylinder contacts the seal carrier and moves the length reduction system to a second configuration such that the second seal engages the outer wall of the inner cylinder and separates the first chamber from the second chamber and substantially prevents a flow of a fluid between the first chamber and the second chamber such that a length of the shock absorber system reduces in response to a pressure in the first chamber when the flow of the fluid is substantially prevented.

2. The apparatus of claim 1, further comprising:
   a number of wheels, wherein the number of wheels is connected to the inner cylinder.

3. The apparatus of claim 1, wherein the first chamber is located between the inner cylinder and the outer cylinder and the second chamber is located inside of the inner cylinder and the outer cylinder.

4. The apparatus of claim 3, wherein the first chamber is located between a first bearing connected to the outer cylinder and a second bearing connected to the inner cylinder.

5. The apparatus of claim 4, wherein the length reduction system is located between a valve located at the first bearing and the tube located inside the outer cylinder.

6. The apparatus of claim 1, wherein the length of the shock absorber system is a first length and wherein application of the pressure within the first chamber causes the inner cylinder to move relative to the outer cylinder such that a second length of the inner cylinder and the outer cylinder is reduced such that the first length is reduced.

7. The apparatus of claim 1, further comprising the seal carrier being adjacent to a biasing system that comprises at least one of: a spring, a belleville washer, and a split ring washer.

8. The apparatus of claim 1, further comprising the seal carrier being in contact with a ring comprising a first flange extending from an inner side of the ring such that the first flange engages a second flange extending from an outer side of the seal carrier such that contact is maintained between the ring and the seal carrier.

9. The apparatus of claim 1, wherein the flow of the fluid occurs from the first chamber to the second chamber when the length reduction system has the first configuration during compression of the shock absorber system and from the second chamber to the first chamber during recoil of the shock absorber system.

10. The apparatus of claim 2 further comprising:
    an actuator system that moves the shock absorber system and the number of wheels between a retracted position and an extended position.

11. An apparatus comprising:
    a ring placed between an outer cylinder and an inner cylinder;
    a seal carrier placed between the outer cylinder and the inner cylinder, such that the seal carrier and the ring move relative to each other between a first configuration and a second configuration along an axis extending centrally through the outer cylinder and the inner cylinder; and
    a first seal and a second seal associated with the seal carrier, wherein, in the second configuration, the first seal engages an inner wall of the outer cylinder and the second seal engages an outer wall of the inner cylinder when the inner cylinder extends out of the outer cylinder and a tube inside the outer cylinder contacts the seal carrier with a force that overcomes a biasing system that distances the seal carrier from the ring, such that the first seal and the second seal separate a first chamber, between the inner cylinder and the outer cylinder, from a second chamber such that an increase of pressure in the first chamber drives the inner cylinder into the outer cylinder along the axis such that a length of the inner cylinder extended out from the outer cylinder reduces.

12. The apparatus of claim 11 further comprising:
the biasing system biasing the seal carrier to remain separated from the ring.

13. The apparatus of claim 11 further comprising:
a first flange extending from an inner side of the ring; and
a second flange extending from an outer side of the seal carrier, wherein the first flange engages the second flange such that contact is maintained between the ring and the seal carrier.

14. A method for changing a length of a landing gear system, the method comprising:
moving a first cylinder and a second cylinder relative to each other along an axis extending centrally through the first cylinder and the second cylinder such that the first cylinder and the second cylinder are in an extended position;
responsive to the first cylinder and the second cylinder being in the extended position, a tube in the first cylinder contacting a seal carrier and moving a length reduction system comprising a ring and the seal carrier distanced from each other by a biasing system, and the seal carrier is located between the first cylinder and the second cylinder, such that a first seal contacts an inner wall of the first cylinder and a second seal contacts an outer wall of the second cylinder substantially preventing a flow of a fluid between a first chamber formed between the first cylinder and the second cylinder and a second chamber within the first cylinder and the second cylinder; and
responsive to a pressure applied to the first chamber, moving the first cylinder and the second cylinder relative to each other along the axis such that a length of the first cylinder and the second cylinder is reduced.

15. The method of claim 14, wherein the first cylinder and the second cylinder are part of a shock absorber system and further comprising:
moving the shock absorber system and a number of wheels connected to the shock absorber system between a retracted position and the extended position.

* * * * *